(12) United States Patent
Li et al.

(10) Patent No.: US 7,572,501 B2
(45) Date of Patent: Aug. 11, 2009

(54) ENGINEERED SELF HEALING CEMENTITIOUS COMPOSITES

(75) Inventors: Victor C. Li, Ann Arbor, MI (US); En-Hua Yang, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 12/104,637

(22) Filed: Apr. 17, 2008

(65) Prior Publication Data

US 2008/0261027 A1    Oct. 23, 2008

Related U.S. Application Data

(60) Provisional application No. 60/912,308, filed on Apr. 17, 2007.

(51) Int. Cl.
*B32B 13/02*    (2006.01)
(52) U.S. Cl. .............. 428/294.7; 106/676; 106/804
(58) Field of Classification Search .............. 428/294.7, 428/332, 500, 523; 525/5; 106/676, 804
See application file for complete search history.

(56) References Cited

U.S. PATENT DOCUMENTS

| | | | | |
|---|---|---|---|---|
| 3,466,822 A | * | 9/1969 | Piccard et al. | ............ 52/223.14 |
| 5,433,777 A | * | 7/1995 | Sheppard | ............ 106/400 |
| 5,564,173 A | * | 10/1996 | Sedman et al. | ............ 28/232 |
| 5,575,841 A | * | 11/1996 | Dry | ............ 106/711 |
| 5,660,624 A | * | 8/1997 | Dry | ............ 106/677 |
| 5,788,760 A | * | 8/1998 | Li et al. | ............ 106/644 |
| 5,989,334 A | * | 11/1999 | Dry | ............ 106/677 |
| 6,261,360 B1 | * | 7/2001 | Dry | ............ 106/677 |
| 6,809,131 B2 | * | 10/2004 | Li et al. | ............ 524/5 |
| 6,969,423 B2 | * | 11/2005 | Li et al. | ............ 106/672 |
| 7,445,823 B2 | * | 11/2008 | Tennison | ............ 428/20 |
| 2008/0107888 A1 | * | 5/2008 | Dry | ............ 428/313.3 |
| 2008/0261027 A1 | * | 10/2008 | Li et al. | ............ 428/332 |

* cited by examiner

*Primary Examiner*—N. Edwards
(74) *Attorney, Agent, or Firm*—Harness, Dickey & Pierce, P.L.C.

(57) ABSTRACT

Cementitious composites engineered for self-healing, combining self-controlled tight crack width and extreme tensile ductility. Self-healing takes place automatically at cracked locations without external intervention. In the exemplary embodiment, fiber-reinforced cementitious composites with self-controlled tight crack width less than 50 μm and tensile ductility more than 2% are prepared. Self-healing in terms of mechanical and transport properties recovery of pre-damaged (by pre-cracking) composite is revealed in a variety of environmental exposures, include wetting and drying cycles, water permeation, and chloride submersion.

17 Claims, 9 Drawing Sheets

ENGINEERED SELF HEALING CEMENTITIOUS COMPOSITES

CROSS-REFERENCE TO RELATED APPLICATIONS

This application claims the benefit of U.S. Provisional Patent Application No. 60/912,308, filed on Apr. 17, 2007. The disclosure of the above application is incorporated herein by reference.

FIELD

The present disclosure relates to a self-healing cementitious composite, and more particularly, to a fiber-reinforced cementitious composite that has self-controlled crack width below 150 μm and preferably below 50 μm, and has a tensile stain capacity at least 1%, so that self-healing can occur in a variety of environmental conditions even when the material is damaged, e.g. by tensile loading.

BACKGROUND AND SUMMARY

The statements in this section merely provide background information related to the present disclosure and may not constitute prior art.

Reinforced concrete members crack due to both applied structural loading and shrinkage and thermal deformations, which are practically inevitable and often anticipated in restrained conditions. These cracks have many negative effects on the mechanical performance and durability of reinforced concrete structures. For example, the presence of cracking reduces the load capacity and stiffness of concrete member. Cracks also provide pathways for the penetration of aggressive ions to cause concrete deterioration. Chlorides, oxygen, and carbonation agents can migrate through cracks and ultimately lead to corrosion of reinforcing steel which is the major cause of concrete deterioration world-wide, and the presence of cracking is the root cause of much of this deterioration. Therefore, the formation of cracks is a dominant form of damage in concrete materials. Hence, the development of self-healing concrete materials in which crack damage can reheal automatically to block transport of water and corrosives into the concrete and down to reinforcing steel and to regenerate a large portion of material load capacity and stiffness under mechanical loads is highly desirable.

The phenomenon of self-healing in concrete has been known for many years. It has been observed that some cracks in old concrete structures are lined with white crystalline material suggesting the ability of concrete to seal the cracks with chemical products by itself, perhaps with the aid of rainwater and carbon dioxide in air. Later, a number of researchers in the study of water flow through cracked concrete under a hydraulic gradient, noted a gradual reduction of permeability over time, again suggesting the ability of the cracked concrete to self-seal itself and slow the rate of water flow. The main cause of self-sealing was attributed to the formation of calcium carbonate, a result of reaction between unhydrated cement and carbon dioxide dissolved in water. Thus, under limited conditions, the phenomenon of self-sealing in concrete is well established. Self-sealing is important to watertight structures and to prolonging service life of infrastructure.

In recent years, there is increasing interest in the phenomenon of mechanical property recovery in self-healed concrete materials. For example, the resonance frequency of an ultra high performance concrete damaged by freeze-thaw actions, and the stiffness of pre-cracked specimens were demonstrated to recover after water immersion. In another investigation, the recovery of flexural strength was observed in pre-cracked concrete beams subjected to compressive loading at early age. In these studies, self-healing was associated with continued hydration of cement within the cracks. As in previous permeability studies, the width of the concrete cracks, found to be critical for self-healing to take place, was artificially limited using feedback controlled equipment and/or by the application of a compressive load to close the preformed crack. These experiments confirm that self-healing in the mechanical sense can be attained in concrete materials.

Deliberate engineering of self-healing in concrete was stimulated by the pioneering research of White and co-workers who investigated self-healing of polymeric material using encapsulated chemicals. A number of experiments were conducted on methods of encapsulation, sensing and actuation to release the encapsulated chemicals into concrete cracks. For example, Li et al. demonstrated that air-curing polymers released into a crack could lead to a recovery of the composite elastic modulus. The chemical release was actuated by the very action of crack formation in the concrete, which results in breaking of the embedded brittle hollow glass fibers containing the polymer. Thus, the healing action took place where it was needed. Another approach, taken by Nishiwaki et al., utilized a repair agent encapsulated in a film pipe that melts under heating. A heating device was also embedded to provide heat to the film pipe at the cracked location when an electric current is externally supplied. Yet another approach, suggested by the experiments of Bang et al. and Rodriguez-Navarro et al., used injected micro-organisms to induce calcite precipitation in a concrete crack. These novel concepts represent creative pathways to artificially inducing the highly desirable self-healing in concrete materials.

From a practical implementation viewpoint, autogenous self-healing is most attractive. Compared with other engineering materials, concrete is unique in that it intrinsically contains micro-reservoirs of unhydrated cement particles widely dispersed and available for self-healing. In most concrete and particularly in those with a low water/cement ratio, the amount of unhydrated cement is expected to be as much as 25% or higher. Upon cracking, the unhydrated cement particles are activated by contact with natural actuators present in the environment such as water or carbon dioxide. Such self-healing commonly takes the form of calcite precipitates or additional hydration products that fill cracks. Through these mechanisms, self-healing concrete materials can uniquely turn environmental deterioration agents into beneficial self-healing reagents. While typically slower acting than encapsulation techniques, autogenous self-healing offers great potential for long lasting functionality because these unhydrated cement particles are known to be long lasting in time, and is also economical when compared with chemical encapsulation or other approaches that have been suggested. As indicated above, the phenomenon of autogenous self-healing has been demonstrated to be effective in transport and mechanical properties recovery. Unfortunately, the reliability and repeatability of autogenous self-healing is unknown. The quality of self-healing is also rarely studied, and could be a concern especially if weak calcite is depended upon for mechanical strength recovery. Perhaps the most serious challenge to autogenous healing is its known dependence on tight crack width, likely less than 150 micron, which is very difficult to achieve in a consistent manner for concrete in the field. In practice, concrete crack width is dependent on steel reinforcement. However, the reliability of crack width control using steel reinforcement has been called into question in recent years. The latest version of the ACI-318 code has all together eliminated the specification of allowable crack width. Thus, a number of serious material engineering challenges await autogenous healing before this phenomenon can be relied upon in concrete structures exposed to the natural environment.

Previous researchers have engaged in limited studies in the phenomenon of concrete self-healing, the formation of self-healing products, and the necessary conditions to experience self-healing in concrete materials. These studies have resulted in identifying three general criteria which are critical to exhibit reliable autogenous self-healing: presence of specific chemical species, exposure to various environmental conditions, and small crack width. Most criteria for engaging autogenous healing in concrete material are satisfied automatically. For example, autogenous healing can occur in a variety of environmental conditions ranging from underwater to cyclic wet-dry exposures. These conditions are readily available for many infrastructure types. Second, adequate concentrations of certain critical chemical species are essential to exhibit autogenous healing mechanisms. This too, is readily available due to the chemical composition of cementitious materials and incomplete hydration, as well as the presence of $CO_2$ in air and NaCl in seawater and deicing salt. However, it has been reported that control of crack width (below 150 µm and preferably below 50 µm) suitable for engaging autogenous healing mechanisms represents the most challenging task in the design and implementation of self-healing concrete materials and it explains why reliable formation of autogenous healing products in most concrete structures is not typically realized.

Figure 1:
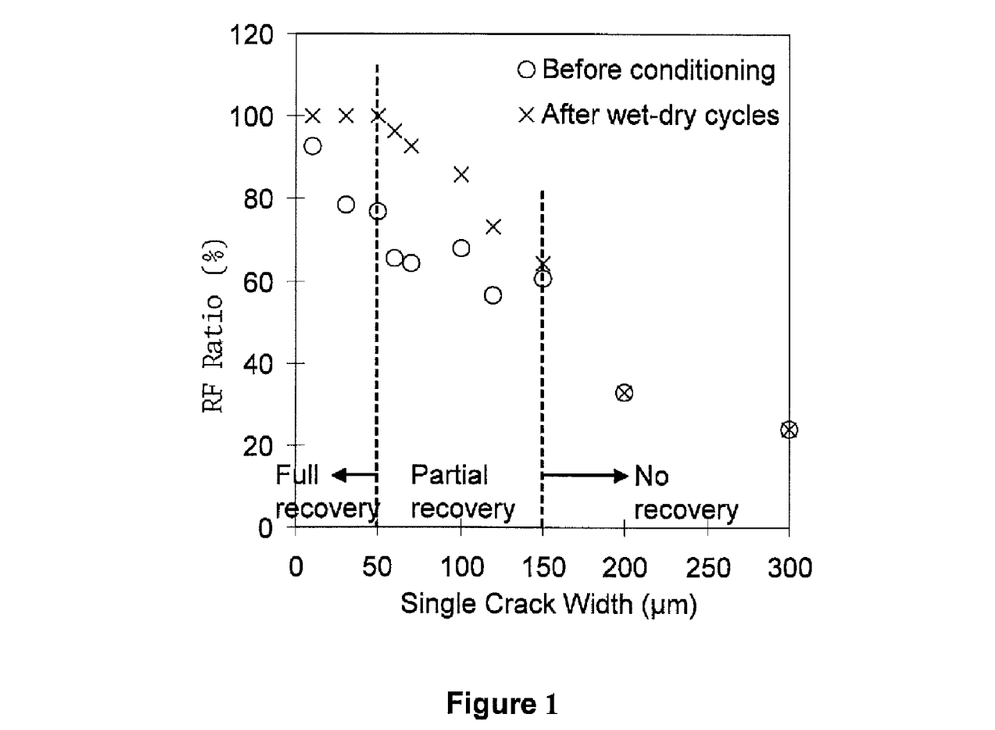
FIG. 1 illustrates resonant frequency of single-crack mortar specimens before and after wet-dry cycles as a function of crack width.

FIG. 1 illustrates the resonant frequency of single-crack mortar specimen before and after wet-dry cycles as a function of crack width. The y-axis gives the resonant frequency of preloaded specimens before and after the prescribed wet-dry exposure, normalized to the resonant frequency of uncracked (virgin) material. Therefor, 100% represents a total recovery of the resonant frequency. As seen in FIG. 1, the resonant frequency of pre-loaded specimens after 10 cyclic wet-dry exposures can recover up to 100% of the uncracked value provided that crack widths are kept below 50 microns. With an increase of crack width, however, the degree of material damage indicated by the drop in resonant frequency increases and the extent of self-healing diminishes. When the crack width exceeds 150 microns, the specimen resonant frequency remains unchanged after undergoing the wet-dry cycle exposure signifying the difficulty of repairing microstructural damage within these cracked materials. Therefore, maintaining a crack width below 150 microns, and preferably below 50 µm, is critical to enable the process of self-healing. This condition is difficult to achieve consistently, and explains why reliable formation of self-healing products in most concrete structures has not been realized. This set of material physical and chemical properties, and exposure conditions, may serve as a reference base towards systematic design of self-healing concrete.

In the referenced work above, crack widths are controlled in feedback controlled loading machines in laboratory conditions. In field conditions, crack width consistently below 150 µm, and especially below 50 µm when the composite is damaged by tensioning to 1% or more, have not been possible prior to the present disclosure. Hence robust autogenous healing under natural conditions has not been previously realized.

Accordingly, the present disclosure provides a self-healing cementitious composite that meets these desirable features. This fiber-reinforced cementitious composite is deliberately engineered to possess self-controlled and highly reliable tight crack width that does not depend on steel reinforcement or structural dimension. Instead, the fibers used in the composite are tailored to work with a mortar matrix in order to suppress localized brittle fracture in favor of distributed microcrack damage with highly controlled crack width, even when the composite is tensioned to several percent strain. Therefore, autogenous self-healing can occur under a variety of environmental conditions when composite is damaged. The composite comprises hydraulic cement, water, sand, fly ash, water reducing agent, and short discontinuous fiber that are mixed to form a mixture having reinforcing fiber uniformly dispersed and having preferable flowability. The mixture is then cast into a mold with desired configuration and cured to form composite.

An object of the present disclosure is to provide a means of achieving self-healing in a fiber-reinforced cementitious composite by embedding self-controlled tight crack width and high tensile ductility intrinsically into the composite.

Another object of the present disclosure is to provide selection criteria for reinforcing fibers to be used in production of self-healing cementitious composite that desired magnitude of self-controlled crack width and ductility in tension can be achieved at low fiber content. A feature of the present disclosure is the use of micromechanics parameters that describe fiber and interface properties to differentiate acceptable fiber from unacceptable fiber.

Yet another object of the present disclosure is to provide fiber-reinforced cementitious products having self-healing behavior under a variety of environmental exposures even when it is tensioned to several percent.

Still another object of the present disclosure is to provide a self-healing material for structural member in construction applications.

In practicing one embodiment of the present disclosure, the binder comprises a hydraulic cement, such as Type I Portland cement. The weight ratio of water to cement is within the range of 0.50 to 0.80. The weight ratio of sand to cement is within the range of 0.8 to 1.0. The discontinuous reinforcing fiber is polyvinyl alcohol with a diameter within the range of 30-60 micrometer and is present from about 1.5% to 3.0% by volume of the composite.

The present disclosure also provides a self-healing fiber-reinforced cementitious composite exhibiting significant multiple cracking when stressed in tension with at least 1% tensile strain and meanwhile having the crack width below 150 micrometer and preferably below 50 µm.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIGS. 10(A) and 10(B) illustrate that throughout the course of permeability testing, a white residue formed within the cracks and on the surface of the specimens near the cracks, wherein FIG. 10(a) illustrates a pre-cracked Mix 1 specimen prior to the beginning of permeability testing and FIG. 10(b) illustrates the same specimen after permeability testing. The white residue forms both within the cracks, and within the pores on the surface of the Mix 1 specimen.

DETAILED DESCRIPTION

The following description is merely exemplary in nature and is not intended to limit the present disclosure, application, or uses.

Practice of the present disclosure involves providing a cementitious mixture comprising selected constituents appropriate for producing a self-healing fiber-reinforced cementitious composite having good workability capable of pumping, spraying and casting like normal concrete. Guideline based on micromechanics consideration is also provided to select suitable and discontinuous short fibers, wherein selection criteria are quantified by several micromechanics characteristics. The produced composite has self-controlled crack width engineered to be less than 150 µm and preferably below 50 µm, and the tensile strain capacity is engineered to be more than 1%. Having self-controlled tight crack width and high strain capacity, autogenous self-healing of damaged composite in a variety of environmental conditions prevails even when the composite is tensioned to several percent strain. Self-sealing cementitious composite is important to watertight structures and to prolonging service life of infrastructure.

The mixture typically comprises hydraulic cement, sand, low calcium fly ash, water, and discontinuous short fibers in proportions or combinations thereof. Other optional constituents, such as viscosity control agent and water reducing agent, are often used to adjust thixotropic rheology and viscosity characteristics to achieve uniform dispersion of fibers.

Figure 2:
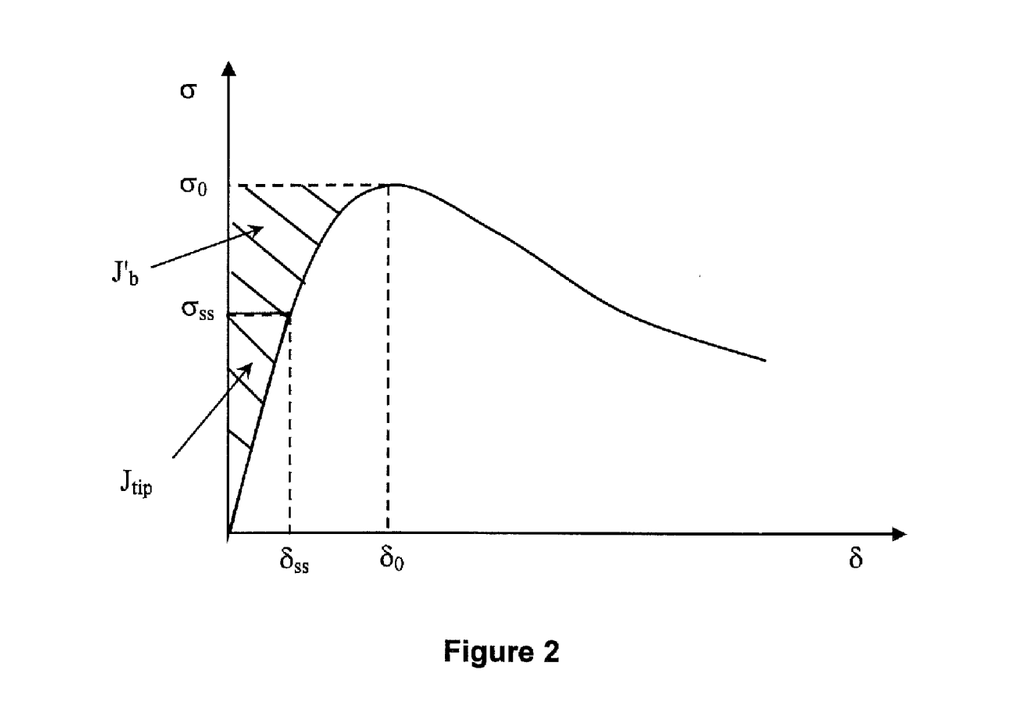
FIG. 2 schematically illustrates Equation (1) on a σ(δ) plot, wherein the hatched area represents the complementary $J_b'$ and the shaded area represents the crack tip toughness $J_{tip}$.

The design of a composite with aforementioned advantages is based on the understanding of the mechanical interactions between fiber, matrix, and interface phases, which can be quantified by micromechanics models. A fundamental requirement for a fiber-reinforced brittle matrix composite to have self-controlled crack width and strain-hardening behavior in tension is that steady-state cracking occurs, wherein a crack increases in length at constant ambient tensile stress $\sigma_{ss}$ while maintaining a constant crack opening $\delta_{ss}$. Marshall and Cox showed that this phenomenon prevails when the condition $$J_{tip} = \sigma_{ss}\delta_{ss} - \int_0^{\delta_{ss}} \sigma(\delta)d\delta \qquad (1)$$

is satisfied. In Equation (1), $J_{tip}$ approaches the matrix toughness $K_m^2/E_m$ at small fiber content, such as less than 3% by volume. $\sigma(\delta)$ is the generalized stress-crack opening relationship, which describes the inelastic deformation $\delta$ at a crack face when subject to ambient stress $\sigma$ and therefore dominates the magnitude of self-controlled crack width of composite. FIG. 2 schematically illustrates Equation (1) on a $\sigma(\delta)$ plot. Since the maximum ambient stress is bounded by peak bridging stress $\sigma_0$, it reveals an upper limit on the matrix toughness for steady state crack propagation mode:

$$\frac{K_m^2}{E_m} \leq \sigma_o\delta_o - \int_0^{\delta_o} \sigma(\delta)d\delta \equiv J'_b \qquad (2)$$

where $\delta_0$ is the crack opening corresponding to $\sigma_0$.

In order to apply the steady-state cracking condition in composite design, the stress-crack opening relationship $\sigma(\delta)$ has to be correlated to micromechanics parameters of each material phase. For the case of discontinuous short fiber-reinforced cementitious composite, a comprehensive analytic $\sigma(\delta)$ model was prepared. In this model, the fiber is characterized in terms of volume fraction $V_f$, fiber length $l_f$, diameter $d_f$, elastic modulus $E_f$ and tensile strength $\sigma_{fu}$. The matrix is characterized in terms of its fracture toughness $K_m$, elastic modulus $E_m$ and initial flaw size distribution $a_0$. The fiber and matrix interaction, or interface characteristics, are described by the interfacial frictional stress $\tau_0$, chemical bond $G_d$ and slip-hardening coefficient $\beta$. Specifically, the energetics of crack propagation along fiber/matrix interface is used to quantify the debonding process and the bridging force of a fiber with given embedment length; statistics is introduced to describe the random nature of preexisting flaws and the random location and orientation of fibers.

Parameter studies based on the foregoing models produces a set of targeted micromechanics properties, which provide guidance to the selection of mixture constituents for achieving self-controlled tight crack width below 50 µm and tensile strain-hardening behavior. Assuming an upper bound of $J_{tip}$ of 5 J/m² for a normal cement mortar, and a targeted composite crack width of 50 μm, the following ranges of fiber and interfacial properties are preferred: fiber strength at least 800 MPa, fiber diameter from 10 to 100 μm and more preferably from 30 to 60 μm, fiber modulus of elasticity from 10 to 300 GPa and more preferably from 40 to 200 GPa, and fiber length from 4 to 30 mm that is partially constrained by processing restriction; interface chemical bonding below 3.0 J/m² and more preferably below 1.5 J/m², interface frictional stress from 1.5 to 4.5 MPa and more preferably from 2.5 to 3.5 MPa, and interface slip hardening coefficient below 2.5 and more preferably below 1.0.

All these fiber and interface properties are determinable prior to forming composite. The interfacial properties can be characterized by single fiber pullout test, while the fiber properties are usually found in specifications from fiber manufacturer.

A variety of commercially available discontinuous short fibers can be used in practicing the present disclosure, following the aforementioned guidance. For purpose of illustration and not limitation, the reinforcing fibers can be selected from a group consisting of aromatic polyamide (i.e. aramid) fiber, high strength and high modulus polyethylene (PE), polyvinyl alcohol (PVA), and high tenacity polypropylene (HTPP). Other fibers that do not satisfy these criteria include carbon fibers, cellulose fibers, low-density polyethylene fibers, certain polypropylene fibers, and steel fibers. In general, since stronger interfacial bond properties can lead to smaller crack width of composite, fiber with hydrophilic surface is preferred in practicing the present disclosure. Due to the presence of hydroxyl groups on molecule chain, hydrophilic fiber has inherent affinity to cementitious matrix, which is characterized by chemical bonding in the micromechanics model. One exemplary fiber is polyvinyl alcohol fiber K-II REC™, available through Kuraray Co. Ltd of Osaka, Japan. The other exemplary fiber is high tenacity polypropylene copolymer fiber, available through Redco of Belgium. Their properties are listed in Table 1 here below.

TABLE 1

Properties of KII-REC PVA Fiber and High Tenacity PP Copolymer Fiber

|  | Nominal Strength (MPa) | Diameter (μm) | Length (mm) | Modulus of Elasticity (GPa) |
|---|---|---|---|---|
| PVA | 1620 | 39 | 8 | 42.8 |
| HTPP | 770 | 11.9 | 6 | 11.2 |

One feature of the present disclosure is using low fiber content typically at 1 to 3 vol. % to achieve aforementioned self-healing composite. For purpose of illustration, 2% volume fraction of fiber is used in the Examples. The lower fiber content makes it feasible for various types of processing, including but not limited to casting, extrusion, or spray. The lower fiber content also enhances economic feasibility and field execution using conventional construction equipment for infrastructure construction applications.

The matrix of the composite is composed of a binder comprising of hydraulic cement. The hydraulic cement refers to cement that sets and hardens in the presence of water, which includes but not limited to a group consisting of Portland cement, blended Portland cement, expansive cement, rapid setting and hardening cement, calcium aluminate cement, magnesium phosphate and the mixture thereof. One exemplary type of cement used in the practice of the present disclosure is Type I Portland cement. Pozzolanic admixtures such as fly ash and silica fume can also be included in the mixture.

Water is present in the fresh mixture in conjunction with viscosity control agent and water reducing agent to achieve adequate rheological properties. The preferred weight ratio of water to cement is 0.4 to 0.6. Viscosity control agent can be used to prevent segregation and to help achieve better fiber dispersion. One suitable group of viscosity control agent consists of methylcellulose, polyvinyl alcohol, and starch. An exemplary viscosity control agent is hydroxypropyl methylcellulose, available as Methocel™ cellulose ethers through Dow Chemical Co., MI, USA. The weight ratio of the viscosity agent to cement is generally controlled at up to 0.01. Water reducing agent is used to adjust workability after the water content in the composite is determined, and the quantity needed varies with the water to cement ratio, the type of lightweight filler and the type of water reducing agent. An illustrative water reducing agent comprises superplasticizer available as ADVA Cast 530 from W. R. Grace & Co., IL, USA, and the typical amount used in practicing the present disclosure is about 0.001 to 0.002 in weight ratio of the water reducing agent to cement.

The mix preparation of the present disclosure can be practiced in any type of concrete or mortar mixer, following conventional FRC mixing procedure. Fibers can either be added at the end when a consistent matrix paste has been reached, or be premixed with dry powders to form a pre-package mortar. Since the workability and rheology can be adjusted in broad range, the fresh mixture can be pumped, cast or sprayed according to construction requirement.

The obtained composite has self-controlled tight crack width below 150 μm and preferably below 50 μm, and tensile strain capacity at least 1%. Self-healing in terms of mechanical and transport properties recovery of damaged composite prevails in a variety of environmental condition. The obtained composite is suitable for watertight structures, such as pipe infrastructure, dam, and water tower. The obtained composite also can be used to prolonging service life of structure, such as transportation infrastructure.

Embodiments of the present disclosure is illustrated though the following examples, which by no means are intended to be limitative thereof.

EXAMPLES

The exemplary mixes set forth below for preparing self-healing fiber-reinforced cementitious composite comprises cement, water, sand, fly ash, water reducing agent, and discontinuous short fiber, and mix proportions are tabulated in Table 2. The cement used is Type I Portland Cement from Holcim Cement Co., MI, USA. Fine sand with a size distribution from 50 to 150 μm, available as F110 through US Silica Co., MV, USA, is used in some mixes to improve the modulus of elasticity. Low calcium fly ash from Boral, Tex., USA is used in all mixes. The water reducing agent used is superplasticizer available as ADVA Cast 530 from W. R. Grace & Co., Illinois, USA. Two types of short discontinuous polymer fibers, K-II REC™ PVA fiber through Kuraray Co. Ltd of Osaka, Japan, and high tenacity PP (HTPP) copolymer fiber from Redco, Belgium, are used at 2% volume fraction. The properties of the PVA and HTPP copolymer fibers can be found in Table 1.

TABLE 2

Mix proportions of Examples, parts by weight

| Mix No. | Cement | Water | Sand | Fly Ash | SP | PVA Fiber by volume | HTPP Fiber by volume |
|---|---|---|---|---|---|---|---|
| 1 | 1 | 0.59 | 0.80 | 1.2 | 0.012 | 0.02 | 0 |
| 2 | 1 | 0.68 | 0.94 | 1.6 | 0.013 | 0.02 | 0 |
| 3 | 1 | 0.78 | 1.10 | 2.0 | 0.013 | 0.02 | 0 |
| 4 | 1 | 0.90 | 1.26 | 2.4 | 0.014 | 0.02 | 0 |
| 5 | 1 | 1.00 | 1.41 | 2.8 | 0.013 | 0.02 | 0 |
| 6 | 1 | 1.08 | 1.55 | 3.2 | 0.019 | 0.02 | 0 |
| 7 | 1 | 1.17 | 1.70 | 3.6 | 0.022 | 0.02 | 0 |
| 8 | 1 | 1.60 | 2.36 | 5.6 | 0.034 | 0.02 | 0 |
| 9 | 1 | 0.89 | 0 | 2.8 | 0.016 | 0 | 0.02 |

The mixture was prepared in a Hobart mixer with a planetary rotating blade. The cement, sand, and fly ash were dry mixed for approximately 1-2 minutes, and then water and the superplasticizer was added and mixed another 2 minutes. Finally, the fibers were slowly added, until all fibers were dispersed into the cementitious matrix. The fresh mixture was cast into plexiglass molds. Specimens were demolded after 24 hours and then cured in sealed bags at room temperature for 7 days. The specimens were then cured in the air until the predetermined testing age of 28 days.

Uniaxial tensile test was conducted to characterize the tensile behavior of the composite. Since some quasi-brittle FRCs show apparent strain-hardening behavior under flexural loading, direct uniaxial tensile test is considered the most convincing way to confirm strain-hardening behavior of the composite. The coupon specimen used here measures 304.8 mm×76.2 mm×12.7 mm. Aluminum plates were glued to the coupon specimen ends to facilitate gripping. Tests were conducted in an MTS machine with 25KN capacity under displacement control. The loading rate is 0.15 mm/min throughout the test. Two external LVDTs (Linear Variable Displacement Transducer) were attached to specimen surface with a gage length of about 180 mm to measure the displacement.

Compression tests were conducted using cylinder specimen measuring 75 mm in diameter and 150 mm in height. The loading rate is 0.50 mm/min., and only the peak loads were recorded.

Figure 3:
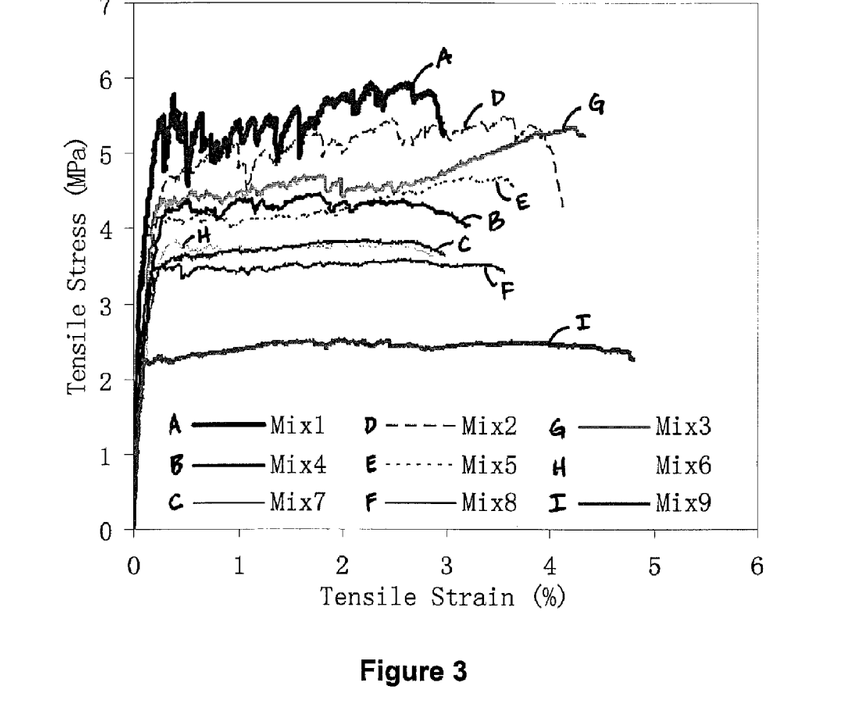
FIG. 3 illustrates complete tensile stress versus strain curves of these composites.

The test results are summarized in Table 3, including crack width, tensile strain capacity and strength, and compressive strength for each Example mix. Residual crack width here is measured after specimen unloading. On unloading, a small amount of crack closing, 15-30%, was observed. Complete tensile stress versus strain curves of these composites are illustrated in FIG. 3, and all of them exhibit significant strain-hardening behavior and self-controlled tight crack width.

TABLE 3

Properties of Examples

| Mix No. | Residual crack width (μm) | Tensile strain capacity (%) | Tensile strength (MPa) | Compressive strength (MPa) |
|---|---|---|---|---|
| 1 | 36 ± 6 | 2.7 ± 1.1 | 5.96 ± 0.24 | 52.6 ± 0.2 |
| 2 | 31 ± 12 | 3.7 ± 0.6 | 5.15 ± 0.43 | 47.5 ± 0.4 |
| 3 | 15 ± 3 | 3.0 ± 1.1 | 4.62 ± 0.49 | 34.2 ± 2.8 |
| 4 | 22 ± 6 | 2.9 ± 0.8 | 4.51 ± 0.27 | 38.4 ± 1.6 |
| 5 | 15 ± 8 | 3.0 ± 0.7 | 4.16 ± 0.33 | 35.2 ± 1.3 |
| 6 | 8 ± 2 | 2.7 ± 0.7 | 3.89 ± 0.60 | 26.7 ± 4.4 |
| 7 | 8 ± 1 | 2.5 ± 0.3 | 3.66 ± 0.14 | 23.9 ± 1.0 |
| 8 | 15 ± 2 | 3.3 ± 0.2 | 3.91 ± 0.25 | 21.4 ± 1.0 |
| 9 | 28 ± 5 | 3.9 ± 1.1 | 2.40 ± 0.10 | 32.3 ± 0.5 |

To demonstrate self-healing, deliberately pre-cracked Mix 1 specimens were exposed to various commonly encountered environments, including water permeation, wetting and drying cycles, and chloride ponding. The mechanical properties studied include dynamic modulus, tensile stiffness, strength, and ductility. The transport properties studied include water permeability and chloride diffusivity.

Specifics of the environmental exposures are summarized below:

CR1 (water/air cycle) subjected pre-cracked Mix 1 specimens to submersion in water at 20° C. for 24 hours and drying in laboratory air at 21±1° C., 50±5% RH for 24 hours, during which no temperature effects are considered. This regime is used to simulate cyclic outdoor environments such as rainy days and unclouded days.

CR2 (water permeation) consisted of continuous permeation through cracked Mix 1 specimen in water at 20° C. till the predetermined testing ages. This regime is used to simulate environmental conditions of infrastructure in continuous contact with water with a hydraulic gradient, such as water tank, pipelines, and irrigation channels.

CR3 (chloride solution submersion) considered direct exposure of pre-cracked Mix 1 specimens to a solution with high chloride content. This regime is used to simulate the exposure to deicing salt in transportation infrastructure or parking structures, or in concrete containers of solutions with high salt content.

The material dynamic modulus measurement based on ASTM C215 (Standard Test Method for Fundamental Transverse, Longitudinal, and Torsional Resonant Frequency of Concrete Specimens) appears to be a particularly promising technique to monitor the extent and rate of autogenous healing. This test method (ASTM C215), which relies on changes in resonant frequency, has proven a good gauge of material degradation due to freeze thaw damage and is specifically referenced within ASTM C666 for freeze thaw evaluation. Rather than quantifying damage; however, it has been adapted to measure the extent and rate of self-healing in cracked concrete, when healing is seen as a reduction in material damage.

Figure 4:
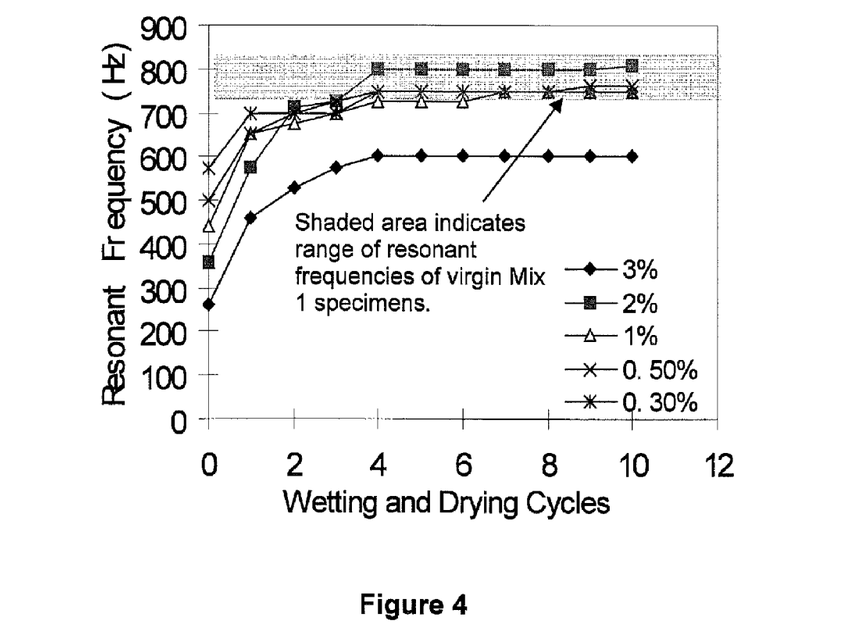
FIG. 4 illustrates the resonant frequency of Mix 1 specimens with various pre-damage levels (0.3%-3%) under cyclic wetting and drying CR1.

Mix 1 coupon specimens measuring 230 mm by 76 mm by 13 mm were prepared and preloaded to different predetermined uniaxial tensile strain levels from 0.3% to 3% at the age of six months. These specimens were subsequently exposed to wet-dry cycles. FIG. 4 illustrates the resonant frequency of Mix 1 specimens with various pre-damage levels (0.3%-3%) under cyclic wetting and drying CR1. The shaded area indicates the range of resonant frequencies of virgin Mix 1 specimens which had undergone the same cyclic wetting and drying environmental exposure. From this figure, it can be seen that the resonant frequencies of all preloaded Mix 1 specimens gradually recovers under both environmental exposures. Ultimately, the resonant frequencies stabilize after 4 to 5 cycles. These results demonstrate that roughly 4 to 5 wetting and drying cycles are adequate to engage noticeable self-healing of cracked Mix 1 material. Specimens subjected to higher pre-tensioning strains exhibit a lower initial frequency after cracking, due to a larger number of cracks (i.e. damage), and ultimately lower recovery values after wet-dry cycles.

Figure 5:
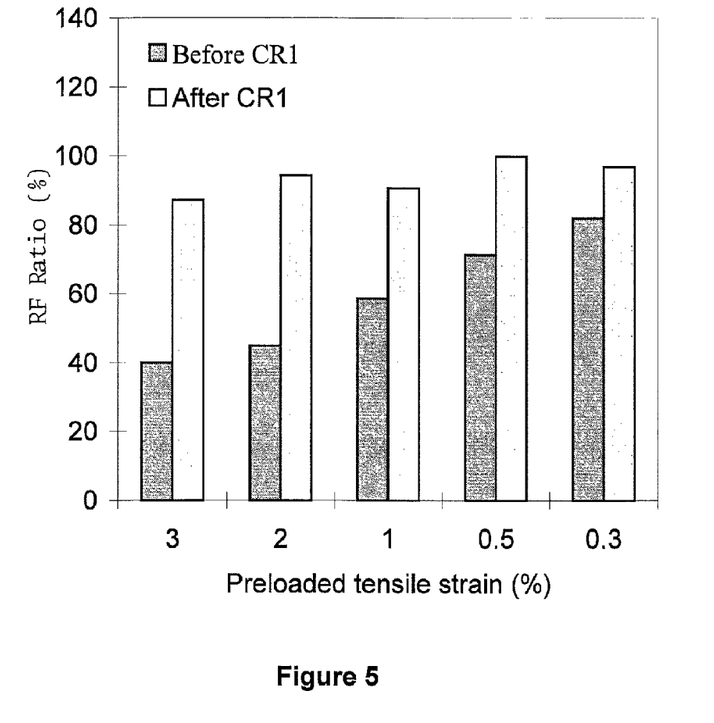
FIG. 5 depicts the extent of self-healing within preloaded Mix 1 specimens subjected to CR1 which can be evaluated by calculating the ratio of the final resonant frequency after wet-dry cycles to the initial uncracked resonant frequency.

The extent of self-healing within preloaded Mix 1 specimens can be evaluated by calculating the ratio of the final resonant frequency after wet-dry cycles to the initial uncracked resonant frequency as depicted in FIG. 5. From FIG. 5 it can be seen that the resonant frequencies for CR1 tests after preloading were 40-82% of initial, while after wet-dry cycles had regained dynamic modulus 87-100% of initial values.

Uniaxial tensile test was conducted to measure the tensile mechanical properties of Mix 1 specimens after self-healing. Mix 1 specimens measuring 230 mm by 76 mm by 13 mm were prepared and preloaded to different predetermined strain levels from 0.3% to 3% at the age of six months. After straining and unloading, the cracked specimens were exposed to 10 wet-dry cycles (CR1). Uniaxial tensile tests were conducted again in the rehealed specimens. In the stress-strain curve of the reloading stage, the permanent residual strain introduced in the preloading stage is not accounted for.

Figure 6A:
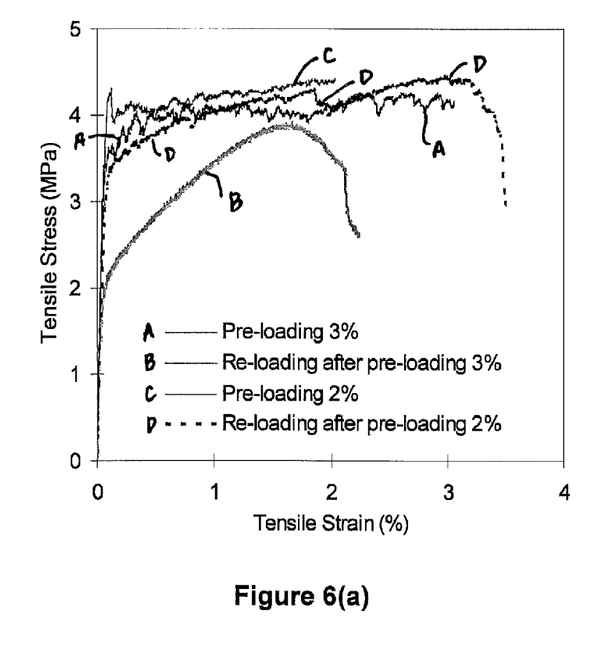
FIGS. 6(A) and 6(B) illustrate the preloading tensile stress-strain curves of Mix 1 specimens as well as the reloading tensile stress-strain curves of rehealed Mix 1 specimens after environmental exposure CR1.
Figure 6B:
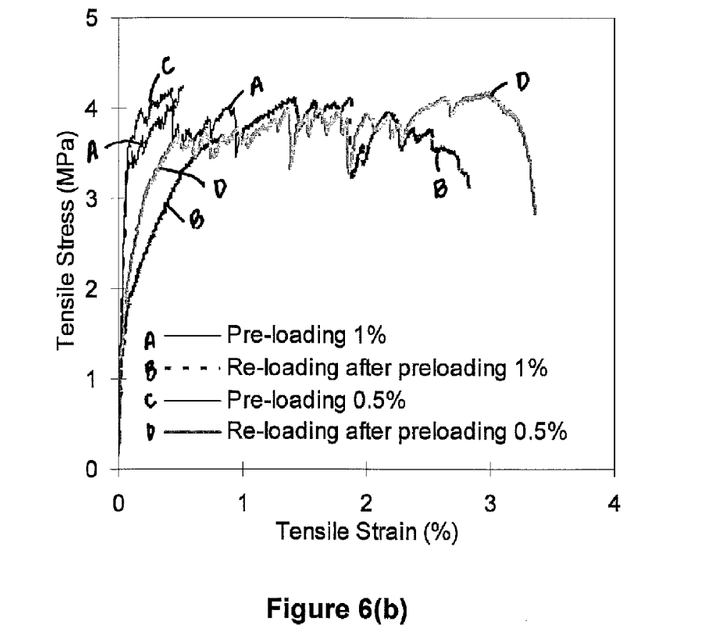

FIG. 6 illustrates the preloading tensile stress-strain curves of Mix 1 specimens as well as the reloading tensile stress-strain curves of rehealed Mix 1 specimens after CR1. As can be seen, the rehealed specimen retained a high tensile strength of 4 MPa and ductility of 1.7% to 3.1% comparable to those of the virgin material.

Figure 7:
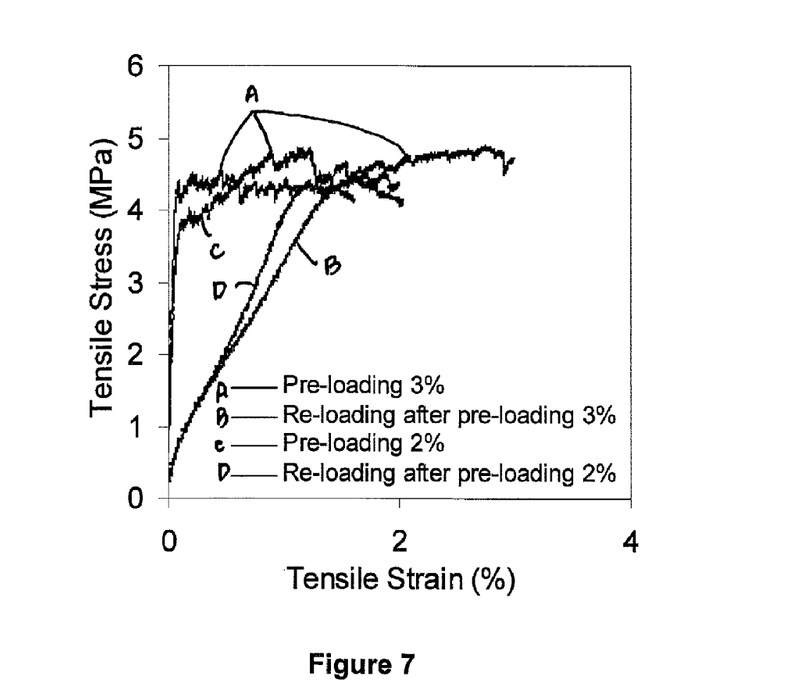
FIG. 7 illustrates the tensile stress-strain curves of Mix 1 specimens which have been preloaded to 2% or 3% strain levels, then unloaded, and immediately reloaded, without healing.

FIG. 7 illustrates the tensile stress-strain curves of Mix 1 specimens which have been preloaded to 2% or 3% strain levels, then unloaded, and immediately reloaded. Thus these specimens have no opportunity to undergo any self-healing. As expected, there is a remarkable difference in stiffness between the virgin specimen and the pre-loaded specimen under tension. This is due to the re-opening of cracks within pre-loaded specimen during reloading. The opening of these cracks offers very little resistance to load, as the crack simply opens to its previous crack width. Once these cracks are completely opened; however, the load capacity resumes, and further tensile straining of the intact material (between adjacent microcracks) can take place. By comparing the material stiffness of self-healed specimens in FIG. 6 with that shown for the preloaded specimens without self-healing in FIG. 7, it can be seen that a significant recovery of the stiffness of Mix 1 specimens after self-healing. In other words, self-healing of Mix 1 material can result not only in possible sealing of cracks as shown by others, but in true rehabilitation of tensile mechanical properties, in this case the stiffness of the material under tensile load.

Figure 8:
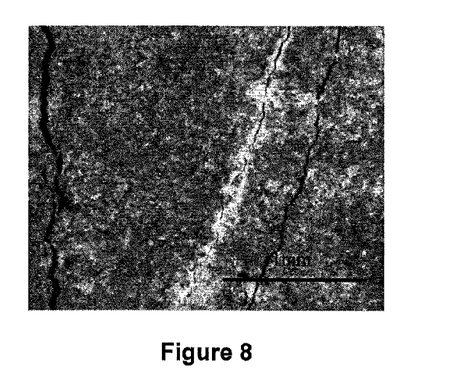
FIG. 8 illustrates a Mix 1 specimen subjected to tensile loading after undergoing self-healing through the CR1 environmental exposure.

FIG. 8 illustrates a Mix 1 specimen subjected to tensile loading after undergoing self-healing through the CR1 environmental exposure. New cracks have been observed to form adjacent to previously self-healed cracks which now show little or no new cracking. The possibility of this event depends heavily upon the cracking properties of the matrix adjacent to the self-healing, and the quality of the self-healing material itself. This phenomenon serves as supplementary testament to mechanical self-healing within Mix 1 material.

Water permeability test was carried out to measure the transport property, permeability coefficient, of material either virgin (uncracked), preloaded (cracked/damaged), or rehealed specimen. To conduct permeability test, a falling head test was used. The permeability of specimens in the falling head test can be determined using Equation 3.

$$k = \frac{a \cdot L}{A \cdot t_f} \left( \frac{h_0}{h_f} \right) \quad (3)$$

where k is the coefficient of permeability, a is the cross sectional area of the standpipe, L is the specimen thickness in the direction of flow, A is the cross sectional area subject to flow, $t_f$ is the test duration, $h_o$ is the initial hydraulic head, $h_f$ is the final hydraulic head, and V is the volume of liquid passed through the specimen during the test.

Permeability specimens were cast into coupon plates with cross sectional dimensions of 13 mm by 76 mm and 305 mm in length. The specimens were preloaded to the predetermined tensile strain. Prior to the permeability testing (CR2), the edges of the coupon specimen were sealed with epoxy to facilitate unidirectional flow through the cross section. Due to the length of time associated with this type of testing, crack width permeability measurements were performed in the unloaded state.

Figure 9:
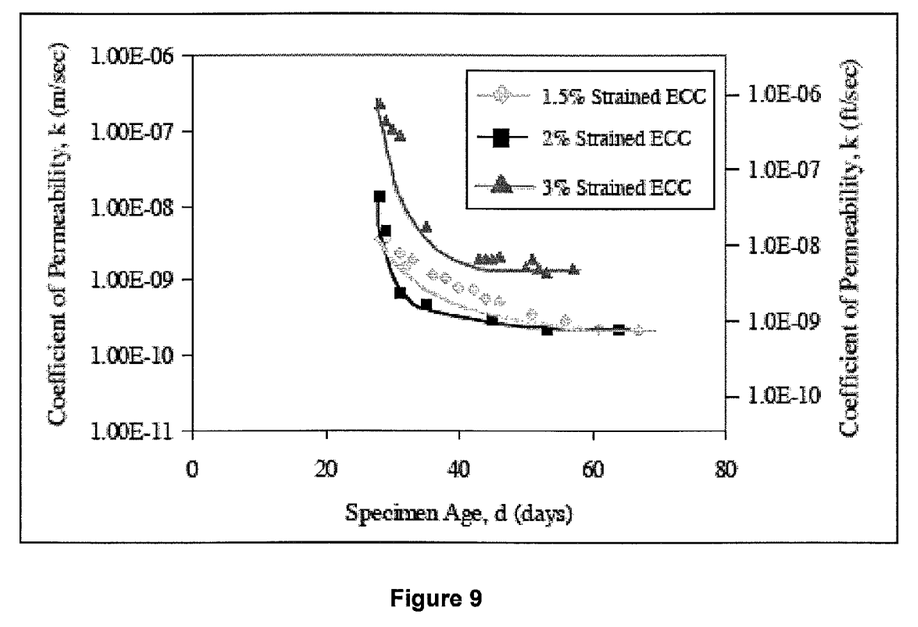
FIG. 9 illustrates the rate of permeation through the Mix 1 specimens dropped drastically from the initial values until asymptotically reaching the recorded value, even though the crack widths during permeability testing do not change.

FIG. 9 illustrates the rate of permeation through the Mix 1 specimens dropped drastically from the initial values until asymptotically reaching the recorded value, even though the crack widths during permeability testing do not change.

Figure 10A:
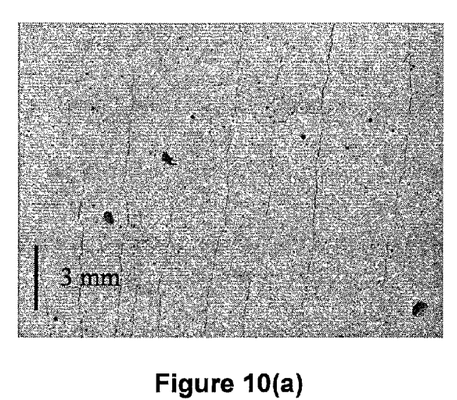
Figure 10B:
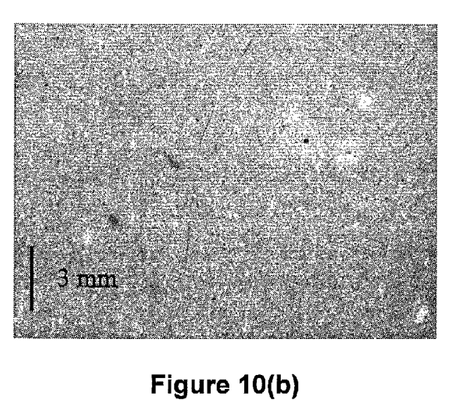

Throughout the course of permeability testing, a white residue formed within the cracks and on the surface of the specimens near the cracks. These formations are shown in FIG. 10. FIG. 10(a) illustrates a pre-cracked Mix 1 specimen prior to the beginning of permeability testing, while FIG. 10(b) illustrates the same specimen after permeability testing. The white residue forms both within the cracks, and within the pores on the surface of the Mix 1 specimen. This can be attributed primarily to the large binder content and relatively low water to binder ratio within the Mix 1 mixture. The presence of significant amounts of unhydrated binders allows for autogeneous healing of the cracks when exposed to water. This mechanism is particularly evident in cracked Mix 1 material due to the small crack widths which facilitate self-healing. After only 3 days in the permeability testing apparatus, evidence of self-healing became apparent.

Figure 11A:
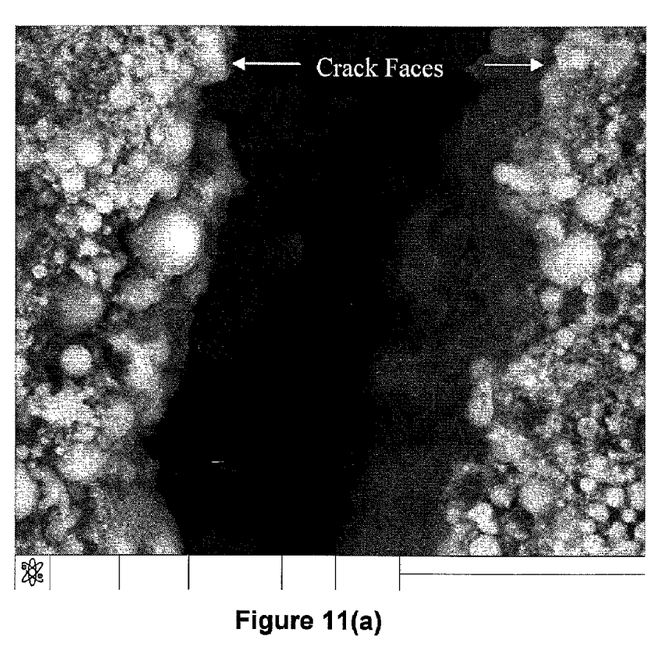
FIGS. 11(a) and 11(b) show the crystals forming within the cracks, and on the surface adjacent to the cracks. Surface chemical analysis (XEDS) review these as hydrated cement products, primarily calcium carbonate.
Figure 11B:
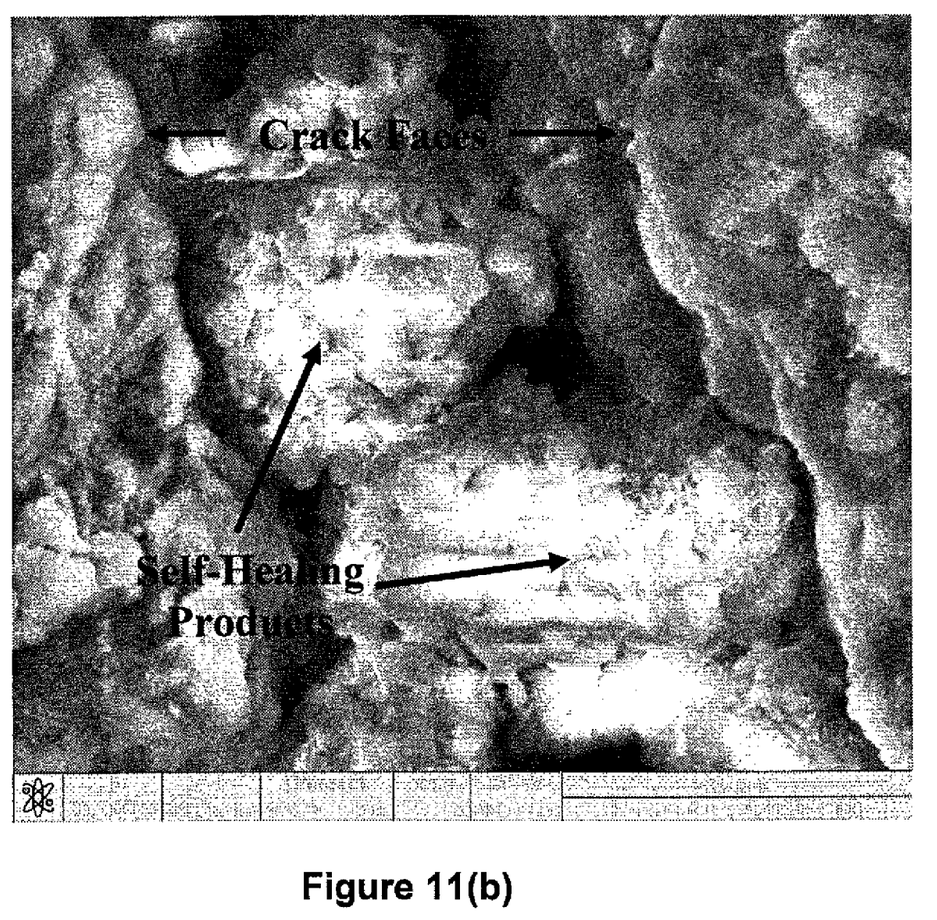

Surface chemical analysis (XEDS) of the self-healing Mix 1 specimens using an environmental scanning electron microscope (ESEM) show that the crystals forming within the cracks, and on the surface adjacent to the cracks, are hydrated cement products, primarily calcium carbonate. These crystal formations within the self-healed cracks are shown in FIG. 11. To facilitate healing of the cracks, and promote formation of calcium carbonate, a flow of water containing carbonates or bicarbonates must be present. Within the permeability testing, these carbonates were introduced by the dissolution of $CO_2$ in air into the water which flows through the specimens. Ultimately, the formation of these crystals slows the rate of permeation through the cracked composite and further reduces the permeability coefficient.

Autogenous self-healing was also observed in an attempt to measure the diffusion coefficient of damaged Mix 1 specimen by means of the chloride ponding test (CR3). Salt ponding test in accordance with AASHTO T259-80 (Standard Method of Test for Resistance of Concrete to Chloride Ion Penetration) was conducted to evaluate another transport property, effective diffusion coefficient, of material. After ponding for a certain period (30 days for the pre-loaded specimen and 90 days for the virgin specimen), the salt solution was removed from the prism surface. Powder samples were taken from the specimen for chloride analysis at various depths from the exposed surface. Total chloride (acid-soluble) content by weight of material at each sampling point was examined according to AASHTO T 260-97 (Standard Method of Test for Sampling and Testing for Chloride Ion in Concrete and Concrete Raw Materials).

The chloride profiles were then input into statistical and curve-fitting software. Equation 4, Crank's solution to Fick's second law, was fitted to the data. The regression analysis yielded the values of the effective diffusion coefficient ($D_e$) and surface chloride concentration ($C_s$) for the specimen.

$$C(x, t) = C_s\left[1 - erf\left(\frac{x}{2\sqrt{D_e t}}\right)\right] \quad (4)$$

where
$C(x,t)$=chloride concentration at time t at depth x
$C_s$=surface chloride concentration
$D_e$=effective chloride diffusion coefficient
t=exposure time
erf( )=error function In conducting the ponding test, Mix 1 prism specimens measuring 356 mm by 76 mm by 51 mm were prepared. In addition to Mix 1 material, mortar prisms were also tested for comparison purpose. The mortar prisms were reinforced with three levels of steel mesh in order to preload the specimen to a predetermined deformation. At the age of 28 days, prisms surface were abraded using a steel brush as required by AASHTO T259-80. The prisms were preloaded using four point bending test to a predetermined deformation. The ponding test was then performed in the unloaded state. Plexiglass was used around the side surfaces of the prism to build an embankment for holding chloride solution on the exposed surface of prisms. At 29 days of age, a 3% of NaCl solution was ponded on the cracked surface of prisms.

Figure 12:
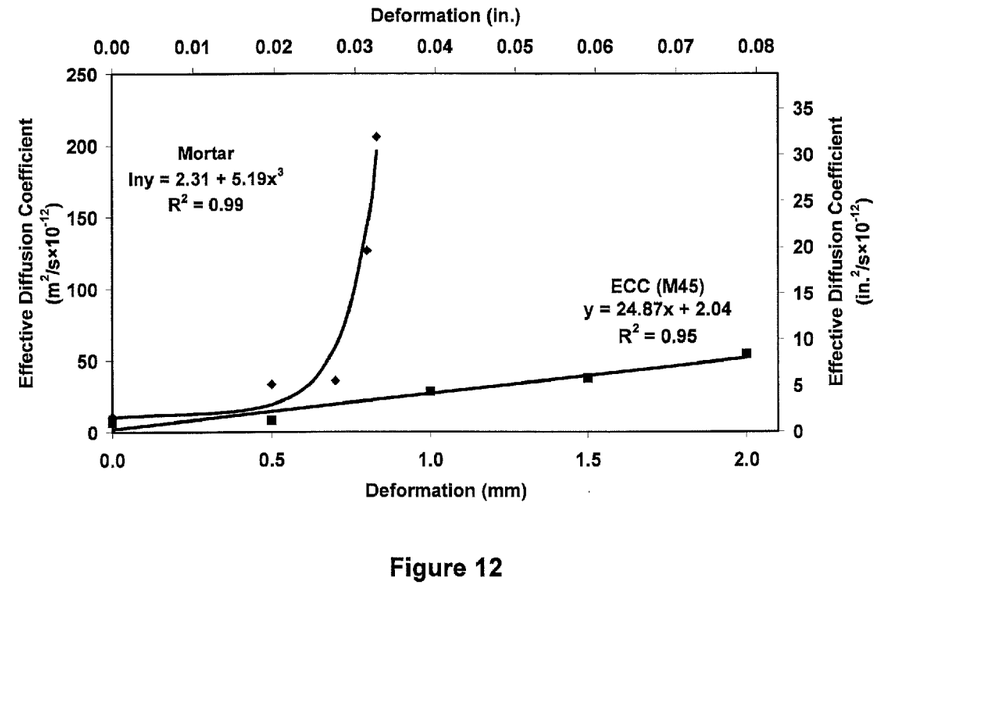
FIG. 12 illustrates the relationship between the effective diffusion coefficient of chloride ions and the beam deformation level, for mortar and Mix 1 specimens.

FIG. 12 illustrates the relationship between the effective diffusion coefficient of chloride ions and the beam deformation level, for mortar and Mix 1 specimens. Despite the same or higher magnitude of imposed overall deformation and higher crack density, the Mix 1 specimens reveal an effective diffusion coefficient considerably lower than that of the reinforced mortar because of the tight crack width control. Especially for the higher deformation level, the effective diffusion coefficient of mortar increased exponentially with beam deformation. The effective diffusion coefficient of Mix 1; however, increased linearly with the imposed deformation value, because the number of microcracks on the tensile surface of Mix 1 is proportional to the imposed beam deformation. The total chloride concentration profiles perpendicular to the crack path indicate no significant chloride penetration even at large imposed deformation (2 mm) for Mix 1 specimens.

Figure 13A:
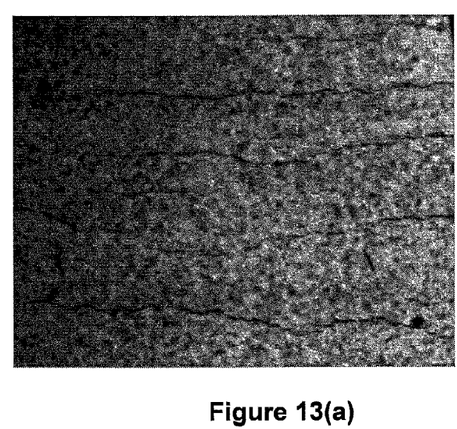
FIGS. 13(a)-13(b) illustrate that in the case of precracked Mix 1 prisms exposed to salt solution, a distinct white deposit was visible over the crack surface at the end of one-month exposure period (FIG. 13(a) illustrates before and FIG. 13(b) illustrates after).
Figure 13B:
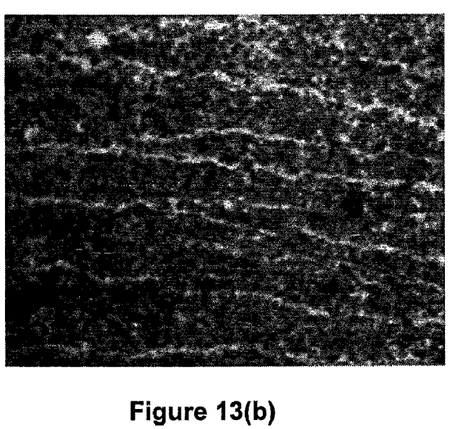
Figure 14:
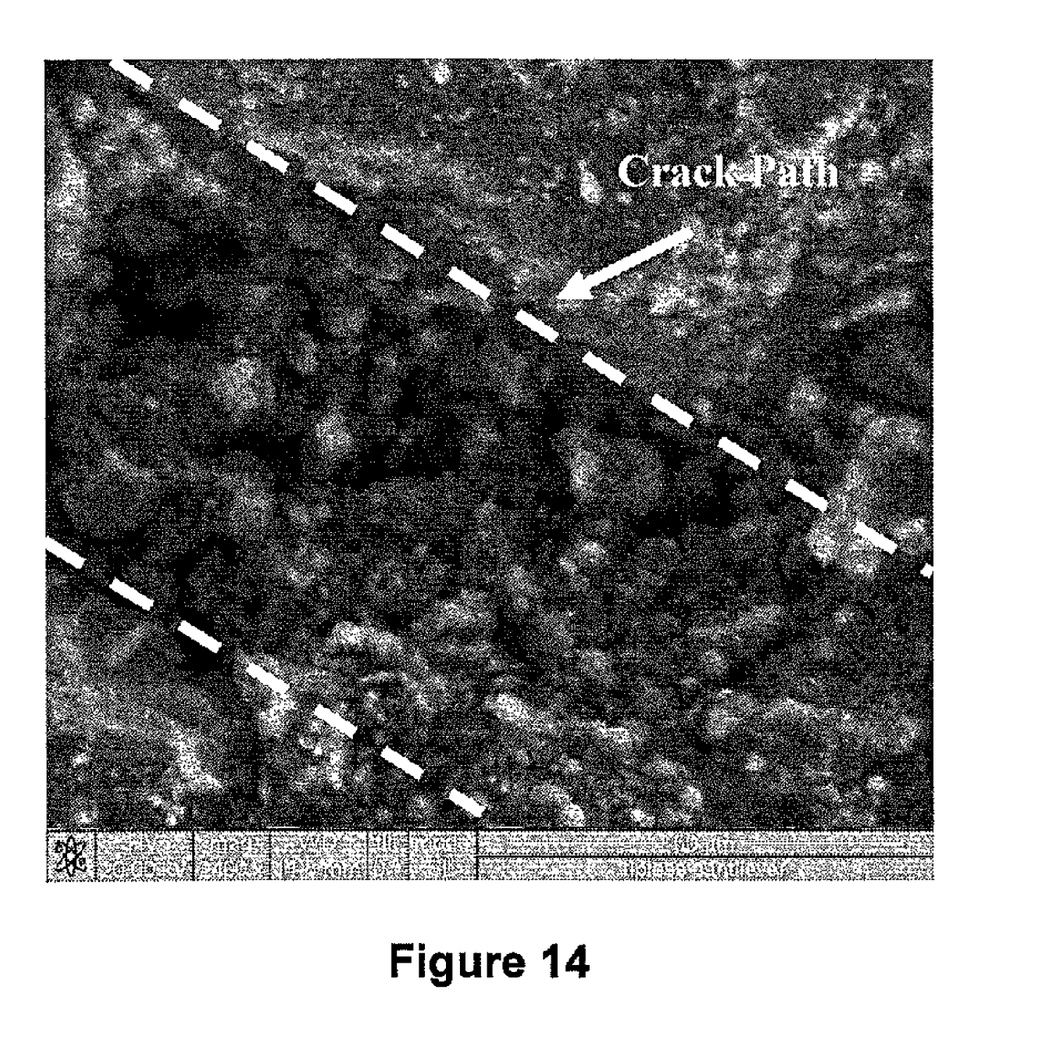
FIG. 14 illustrates an environmental scanning electron microscope (ESEM) observation of the fractured surface of Mix 1 across a healed crack.

The reason for the relatively low diffusion coefficient of cracked Mix 1 specimens is not only due to the tight crack width but also the presence of self-healing of the microcracks. The self-healing of cracks becomes prominent when crack width is small. In the case of precracked Mix 1 prisms exposed to salt solution, a distinct white deposit was visible over the crack surface at the end of one-month exposure period (FIG. 13). These deposits were most probably caused by efflorescence due to leaching of calcium hydroxide (CH) into cracks and due to the presence of NaCl ion in solution. This white deposit on the crack surface easily blocked the flow path due to smaller crack width of Mix 1. An environmental scanning electron microscope (ESEM) observation of the fractured surface of Mix 1 across a healed crack is shown in FIG. 14. The present ESEM observations show that most of the products seen in the cracks were newly formed C—S—H gels. Calcium hydroxide (CH) and deposition of salts in the crack path were also observed. These observations indicate that microcracks of Mix 1 exposed to NaCl solution healed completely after exposure for 30 days to NaCl solution. This can be attributed primarily to the large fly ash content and relatively low water to binder ratio within the Mix 1 mixture. The continued pozzolanic activity of fly ash is responsible for the self-healing of the crack which reduces the ingress of the chloride ions.

What is claimed is:

1. A self-healing fiber-reinforced cementitious composite comprising:
   a cementitious matrix; and
   a plurality of discontinuous short fibers having a volume fraction from about 1% to about 4%, said plurality of discontinuous short fibers being generally uniformly-distributed within said cementitious matrix, said plurality of discontinuous short fibers maintaining a persistent self-controlled crack width below 150 μm,
   wherein said composite exhibiting strain-hardening behavior under tension with at least 1% strain capacity, said composite having compressive strength in excess of 20 MPa, and said composite self-sealing said persistent self-controlled crack in a variety of environmental conditions.

2. The composite of claim 1 wherein said plurality of discontinuous short fibers is selected from a group consisting of aramid, polyvinyl alcohol, high modulus polyethylene, and high tenacity polypropylene.

3. The composite of claim 1 wherein said plurality of discontinuous short fibers have an average diameter of 10 to 100 micrometer and an average length of 4 to 30 mm.

4. The composite of claim 1 wherein said cementitious matrix comprises Portland cement.

5. The composite of claim 1, further comprising:
   fine aggregates at a weight ratio to a binder up to 2.0.

6. The composite of claim 1, further comprising:
   a viscosity agent at a weight ratio to a binder up to 0.01.

7. The composite of claim 6 wherein said viscosity agent is selected from a group consisting of methylcellulose, polyvinyl alcohol, starch and mixture thereof.

8. The composite of claim 1, further comprising:
   at least one of fly ash and silica fume.

9. The composite of claim 1 wherein said composite has a persistent self-controlled crack width below 50 μm.

10. A self-healing fiber-reinforced cementitious composite comprising:
    a cementitious matrix; and
    a plurality of discontinuous short fibers having a volume fraction from about 1% to about 4% and an average length of 4 to 30 mm, said plurality of discontinuous short fibers being generally uniformly-distributed within said cementitious matrix,
    wherein said composite having a persistent self-controlled crack width below 150 μm thereby permitting self-sealing of said persistent self-controlled crack, said composite exhibiting strain-hardening behavior under tension with at least 1% strain capacity, and said composite having compressive strength in excess of 20 MPa.

11. The composite of claim 10 wherein said plurality of discontinuous short fibers is selected from a group consisting of aramid, polyvinyl alcohol, high modulus polyethylene, and high tenacity polypropylene.

12. The composite of claim 10 wherein said plurality of discontinuous short fibers have an average diameter of 10 to 100 micrometer.

13. The composite of claim 10, further comprising:
fine aggregates at a weight ratio to said cementitious matrix up to 2.0.

14. The composite of claim 10, further comprising:
a viscosity agent at a weight ratio to said cementitious matrix up to 0.01.

15. The composite of claim 14 wherein said viscosity agent is selected from a group consisting of methylcellulose, polyvinyl alcohol, starch and mixture thereof.

16. The composite of claim 10, further comprising:
at least one of fly ash and silica fume.

17. The composite of claim 10 wherein said composite has a persistent self-controlled crack width below 50 μm.

* * * * *